United States Patent [19]

Ohmae et al.

[11] Patent Number: 5,367,013
[45] Date of Patent: Nov. 22, 1994

[54] PROCESS FOR PRODUCING REINFORCED CRYSTALLINE ENGINEERING PLASTIC COMPOSITION

[75] Inventors: Tadayuki Ohmae; Yoshiki Toyoshima; Hisao Tanaka; Noboru Yamaguchi; Kenzo Chikanari, all of Chiba, Japan

[73] Assignee: Sumitomo Chemical Company, Limited, Osaka, Japan

[21] Appl. No.: 958,727

[22] Filed: Oct. 9, 1992

[30] Foreign Application Priority Data

Oct. 9, 1991 [JP] Japan .................. 3-261895

[51] Int. Cl.⁵ .................................. C08K 3/00
[52] U.S. Cl. ........................ 524/494; 524/513; 524/514; 523/400; 523/436; 523/444; 523/466
[58] Field of Search ............ 524/494, 513, 514; 523/400, 436, 444, 466

[56] References Cited

U.S. PATENT DOCUMENTS

| | | | |
|---|---|---|---|
| 4,537,929 | 8/1985 | Nangrani | 524/504 |
| 4,929,665 | 5/1990 | Inoue et al. | 523/466 |
| 5,028,649 | 7/1991 | Efner | 524/494 |
| 5,137,942 | 8/1992 | Shorr | 524/492 |

FOREIGN PATENT DOCUMENTS

| | | |
|---|---|---|
| 0177401 | 4/1986 | European Pat. Off. |
| 0187650 | 7/1986 | European Pat. Off. |
| 0286965 | 10/1988 | European Pat. Off. |
| 0315451 | 10/1989 | European Pat. Off. |
| 0375177 | 6/1990 | European Pat. Off. |
| 0393409 | 10/1990 | European Pat. Off. |
| 55-44108 | 11/1980 | Japan . |
| 57-123251 | 7/1982 | Japan . |
| 58-47419 | 10/1983 | Japan . |
| 59-28223 | 7/1984 | Japan . |
| 59-152953 | 8/1984 | Japan . |
| 61-44897 | 10/1986 | Japan . |
| 63-305148 | 12/1988 | Japan . |
| 64-5068 | 1/1989 | Japan . |
| 64-5618 | 1/1989 | Japan . |
| 64-6665 | 2/1989 | Japan . |
| 64-87656 | 3/1989 | Japan . |
| 1-278544 | 11/1989 | Japan . |
| 1-306461 | 12/1989 | Japan . |
| 2-382 | 1/1990 | Japan . |
| 2-24353 | 1/1990 | Japan . |
| 2-166153 | 6/1990 | Japan . |
| 3-7757 | 1/1991 | Japan . |
| 3-26752 | 2/1991 | Japan . |

OTHER PUBLICATIONS

Derwent Publications Ltd., London, GB; AN 92-138043 & JP-A04 080 263 (Asahi Chem) Mar. 13, 1992.
Derwent Publications Ltd., London, GB; AN 89-297876 & JP-A-1 221 450 (Unitika) Sep. 4, 1989.
Derwent Publications Ltd., London, GB; AN 86-216194 & JP-A-61 148 261 (Toray) Jul. 5, 1986.

*Primary Examiner*—Edward Cain
*Attorney, Agent, or Firm*—Sughrue, Mion, Zinn, Macpeak & Seas

[57] ABSTRACT

A process for producing a reinforced crystalline engineering plastic composition is disclosed, comprising melt-kneading (A) from 60 to 97 parts by weight of a crystalline engineering plastic and (B) from 5 to 100 parts by weight, per 100 parts by weight of the sum of (A) and (C), of glass fibers and melt-kneading the resulting mixture with (C) from 3 to 40 parts by weight of an epoxy- or acid anhydride-containing ethylene copolymer. The composition obtained provides, with excellent moldability, a molded article having an improved appearance while exhibiting well-balanced mechanical and thermal properties.

6 Claims, No Drawings

PROCESS FOR PRODUCING REINFORCED CRYSTALLINE ENGINEERING PLASTIC COMPOSITION

FIELD OF THE INVENTION

This invention relates to a process for producing a reinforced crystalline engineering plastic composition which has excellent moldability in injection molding or extrusion molding to provide a molded article or sheeting having improved surface smoothness, while retaining excellent mechanical and thermal properties possessed by reinforced engineering plastics, such as impact resistance, rigidity, and heat resistance.

BACKGROUND OF THE INVENTION

Crystalline engineering plastics are used in a broad field of industry, such as electric and electronic parts and automobile parts. In particular, glass fiber-reinforced engineering plastics have been attracting attention in the field requiring high rigidity and high heat distortion temperature. However, in spite of greatly improved mechanical properties, such as impact resistance, and heat resistance, the molded articles obtained from the glass fiber-reinforced engineering plastics have a deteriorated appearance, such as surface smoothness. A further improvement has therefore been demanded particularly for application to the field giving special weight to an appearance of a molded article, such as electrical parts and automobile parts.

It is known that the impact resistance of engineering plastics can be improved by addition of an epoxy group- or acid anhydride group-containing ethylene copolymer. For example, addition of such an impact modifier to polyester resins is disclosed in JP-B-58-47419 and JP-B-59-28223 (the term "JP-B" as used herein means an "examined published Japanese patent application"); that to polyphenylene sulfide resins is disclosed in JP-B-2-382; that to polycarbonate resins is disclosed in JP-B-61-44897; that to polyarylate resins, polyester carbonate resins, and polysulfone resins is disclosed in JP-A-57-123251 (the term "JP-A" as used herein means an "unexamined published Japanese patent application"); and that to polyamide resins is disclosed in JP-B-55-44108.

It is also known that addition of glass fibers to crystalline resins brings about considerable improvements in mechanical properties, such as tensile strength, compression strength, and flexural rigidity, and heat resistance. For example, JP-B-64-5068 proposes a plastic composition comprising a polyester resin, an epoxy group-containing ethylene copolymer, and glass fibers of specific shape, which provides a molded article with an improved appearance. JP-B-64-6665 proposes to subject a molded article prepared by melt molding a composition comprising a polyester resin, an epoxy compound, and glass fibers to a heat treatment at 200° to 280° C. for 20 minutes or more. Further, JP-A-59-152953 proposes a composition comprising a polyphenylene sulfide resin, an epoxy group-containing ethylene copolymer, and glass fibers.

As a result of studies by the inventors, however, it turned out that the molded articles obtained by the above-mentioned conventional techniques show some improvements bull not to a sufficient degree. A further improvement especially in appearance of a molded article is still demanded.

SUMMARY OF THE INVENTION

An object of the present invention is to provide a process for producing a glass fiber-reinforced crystalline engineering plastic composition which provides, with excellent moldability, a molded article having a satisfactory appearance while exhibiting mechanical properties, such as rigidity and impact resistance, and heat resistance.

The present inventors have intensively and extensively investigated a process for producing an improved resin composition mainly comprising an engineering plastic and found, as a result, that addition of glass fibers and a specific ethylene copolymer to engineering plastics by a special kneading method provides a composition excellent in appearance of molded articles without imparing mechanical properties, such as rigidity and impact resistance, heat resistance, as well as moldability. The present invention has been completed based on this finding.

The present invention relates to a process for producing a reinforced crystalline engineering plastic composition, which comprises melt-kneading (A) from 60 to 97 parts by weight of a crystalline engineering plastic and (B) from 5 to 100 parts by weight, per 100 parts by weight of the sum of (A) and (C), of glass fibers and melt-kneading the resulting mixture with (C) from 3 to 40 parts by weight of an ethylene copolymer containing an epoxy group or an acid anhydride group.

DETAILED DESCRIPTION OF THE INVENTION

The crystalline engineering plastic as component includes those described, e.g., in *Encyclopedia of Polymer Science and Engineering*, Vol. 6, pp. 94–131, John Willey & Sons (1986), such as acetal resins, polyamide resins (e.g., polyamide 66, polyamide 6, and polyamide 12), polyester resins (e.g., polybutylene terephthalate and polyethylene terephthalate), polyphenylene sulfide resins, and polyether ketone resins.

The glass fibers as component (B) are obtained from an inorganic glass composed of oxides, e.g., $SiO_2$, $B_2O_3$, $Al_2O_3$, $CaO$, $Na_2O$, and $K_2O$. Alkali-free glass (E glass), alkali-containing glass (C glass or A glass), etc. are employable, with E glass commonly used for resin reinforcement being preferred because of its great reinforcing effect. About 3 to 6 mm long chopped strands generally used for resin reinforcement are used. The glass fibers may be used either as produced or, for preference after being treated with a coupling agent, such as a silane coupling agent (e.g., aminosilane, epoxysilane), a titanium coupling agent, or a chromium coupling agent, for imparting affinity to engineering plastics or with plastic greige goods for bundling of glass fibers.

The epoxy group-containing ethylene copolymer as component (C) is a copolymer comprising (a) an ethylene unit, (b) an unsaturated epoxy compound unit and, if desired, (c) an ethylenically unsaturated ester compound unit. While not limiting, the copolymer preferably comprises from 50 to 99% by weight of unit (a), from 0.1 to 50% by weight, and particularly from 1 to 20% by weight, of unit (b), and up to 50% by weight of unit (c), based on the weight of the copolymer.

Unsaturated epoxy compounds providing unit (b) include unsaturated compounds containing an epoxy group, such as unsaturated glycidyl esters, e.g., glycidyl acrylate and glycidyl methacrylate. Ethylenically unsaturated compounds providing unit (c) include $\alpha,\beta$- unsaturated carboxylic acid alkyl esters, carboxylic acid vinyl esters, olefins (e.g., propylene, butene-1), and styrene or derivatives thereof.

The epoxy group-containing ethylene copolymer is prepared by high-pressure radical copolymerization, graft copolymerization, and the like.

Examples of suitable copolymers obtained by high-pressure radical polymerization include a copolymer comprising an ethylene unit and a glycidyl methacrylate unit, a copolymer comprising an ethylene unit, a glycidyl methacrylate unit, and a methyl acrylate unit, a copolymer comprising an ethylene unit, a glycidyl methacrylate unit, and an ethyl acrylate unit, and a copolymer comprising an ethylene unit, a glycidyl methacrylate unit, and a vinyl acetate unit.

Examples of suitable copolymers obtained by graft copolymerization include a glycidyl methacrylate-grafted ethylene-propylene copolymer, a glycidyl methacrylate-grafted ethylene-propylene-diene copolymer, and a glycidyl methacrylate-grafted ethylene-butene-1 copolymer.

The acid anhydride group-containing ethylene copolymer as component (C) includes a copolymer comprising (a) an ethylene unit and (d) a maleic anhydride unit and a copolymer comprising (a) an ethylene unit, (d) a maleic anhydride unit, and (e) an ethylenically unsaturated compound unit. Ethylenically unsaturated compounds providing unit (e) include $\alpha,\beta$-unsaturated carboxylic acid alkyl esters, carboxylic acid vinyl esters, olefins (e.g., propylene, butene-1), and styrene or derivatives thereof. While not limiting, the former copolymer preferably comprises from 40 to 99% by weight of unit (a) and from 0.1 to 10% by weight, particularly from 0.3 to 10% by weight, and more preferably from 0.5 to 5% by weight, of unit (d), based on the weight of the copolymer; and the latter copolymer preferably comprises from 40 to 90% by weight of unit (a), from 0.3 to 10% by weight of unit (d), and from 5 to 60% by weight of unit (e), based on the weight of the copolymer.

The acid anhydride group-containing ethylene copolymer is prepared by high-pressure radical copolymerization, graft copolymerization, and the like.

Examples of suitable copolymers obtained by high-pressure radical copolymerization include a copolymer comprising an ethylene unit and a maleic anhydride unit, a copolymer comprising an ethylene unit, a maleic anhydride unit, and a methyl acrylate unit, a copolymer comprising an ethylene unit, a maleic anhydride unit, and an ethyl acrylate unit, a copolymer comprising an ethylene unit, a maleic anhydride unit, and a butyl acrylate unit, and a copolymer comprising an ethylene unit, a maleic anhydride unit, and a methyl methacrylate unit.

Examples of suitable copolymers obtained by graft copolymerization include a maleic anhydride-grafted ethylene-propylene copolymer, a maleic anhydride-grafted ethylene-propylene-diene copolymer, and a maleic anhydride-grafted ethylene-butene-1 copolymer.

The epoxy group- or acid anhydride group-containing ethylene copolymer as component (C) has a melt index (JIS K6760) of from 0.5 to 100 g/10 min. If its melt index exceeds 100 g/10 min, the resulting composition has reduced mechanical properties. The copolymer having a melt index of less than 0.5 g/10 min has poor compatibility with engineering plastics.

The epoxy group- or acid anhydride group-containing ethylene copolymer can be prepared through various processes, such as random copolymerization in which an unsaturated epoxy compound or an unsaturated acid anhydride compound is introduced into the main chain of a copolymer, or graft copolymerization in which an unsaturated epoxy compound or an unsaturated acid anhydride compound is introduced into the side chain of a copolymer. More specifically, radical copolymerization can be carried out in the presence of an unsaturated epoxy compound or an unsaturated acid anhydride compound and a radical generator at 100° to 300° C. under a pressure of from 500 to 4,000 atm. either in the presence or absence of an appropriate solvent and a chain transfer agent; or graft copolymerization can be carried out by melt-mixing an ethylene-propylene copolymer with an unsaturated epoxy compound or an unsaturated acid anhydride compound and a radical generator in an extruder.

The reinforced crystalline engineering plastic composition according to the present invention comprises 60 to 97 parts by weight, and preferably from 70 to 90 parts by weight, of component (A) and from 3 to 40 parts by weight, and preferably from 10 to 30 parts by weight, of component (C), based on 100 parts by weight of the sum of components (A) and (C). If the proportion of component (A) is less than 60 parts by weight, the rigidity and heat resistance would be sufficient. If it exceeds 97 parts by weight, the impact resistance would be reduced.

The compounding ratio of component (B) ranges from 5 to 100 parts by weight, and preferably from 10 to 60 parts by weight, per 100 parts by weight of the sum of components (A) and (C). If it is less than 5 parts by weight, sufficient mechanical strength cannot be obtained. If it exceeds 100 parts by weight, the composition is difficult to mold, only to provide a molded article having poor appearance and insufficient toughness.

The reinforced crystalline engineering plastic composition of the present invention is prepared by first melt-kneading components (A) and (B) and then melt-kneading the resulting mixture with component (C). Such a specific compounding method being followed, there is obtained a resin composition which provides a molded article with a markedly improved appearance while retaining satisfactory mechanical properties, such as rigidity and impact resistance, satisfactory heat resistance, and satisfactory moldability.

The melt-kneading can be performed by using generally employed kneading machines, such as a single-screw extruder, a twin-screw extruder, a Banbury mixer, a roll, and various kneaders.

The reinforced crystalline engineering plastic composition may be obtained by once preparing pellets from the molten mixture of components (A) and (B) by means of an extruder and then melt-kneading the resulting pellets with component (C) in an extruder. For preference, the composition is obtained by means of a single extruder equipped with a side feeder, to the front part of which (feed side) are fed components (A) and (B) to prepare a molten mixture, and to the rear part of which (die side) is fed component (C) either in a solid state or a molten state. It is also possible that a molten mixture of components (A) and (B) is once pelletized by means of an extruder, and then the pellets are dry blended with pellets of component (C). The resulting blended pellets can be melt-kneaded in a molding machine, such as an injection molding machine, to directly produce a molded article. One step of melt-kneading being thus omitted, this method is industrially advantageous.

In order to inhibit breaking of the glass fibers during the melt-kneading of components (A) and (B), the glass fibers are preferably added to a molten engineering plastic composition. In this case, the above-mentioned side feeder is preferably used.

Kneading of the components is preferably carried out uniformly by means of a tumbling mixer, a Henschel mixer, or the like apparatus. If necessary, mixing may be omitted, and each component may be quantitatively supplied to a kneading machine.

If desired, the composition of the present invention may further contain other additives or other resin components as far as the physical properties are not impaired. Useful additives include crosslinking agents, compatibilizers, compatibilization accelerators, pigments, dyes, thermal stabilizers, antioxidants, weathering agents, nucleating agents, antistatic agents, flame retarders, plasticizers, and other reinforcing materials or fillers (e.g., carbon fibers, talc, calcium carbonate, and magnesium hydroxide).

The reinforced crystalline engineering plastic composition according to the present invention can be molded with satisfactory moldability by injection molding, extrusion molding, blown-film extrusion molding, and the like techniques.

The present invention is now illustrated in greater detail with reference to the following Examples and Comparative Examples, but it should be understood that the present invention is not construed as being limited thereto. All the parts and ratios are given by weight unless otherwise indicated.

In the Examples and Comparative Examples hereinafter described, the following components were used.
(A) Crystalline engineering plastics:

1) "TOUGHPET® PBT N1000", polybutylene terephthalate produced by Mitsubishi Rayon Co., Ltd.; intrinsic viscosity: 1.0 (hereinafter abbreviated as PBT)

2) "MA 2103", polyethylene terephthalate produced by Unitika Ltd.; intrinsic viscosity: 0.68 (hereinafter abbreviated as PET)

3) "A 1020 BRL", polyamide 6 produced by Unitika Ltd.; relative viscosity: 2.1 (hereinafter abbreviated as PA-6)

4) "UBE Nylon 2015B", polyamide 66 produced by Ube Industries, Ltd.; relative viscosity: 2.6 (hereinafter abbreviated as PA-66)

(B) Glass fiber:

1) "CS-03-MA419" for PBT (hereinafter referred to as glass fiber (1))

2) "CS-03-MA429" for PET (hereinafter referred to as glass fiber (2))

3) "CS-03-MAFT 558" for PA-6 (hereinafter referred to as glass fiber (3))

4) "CS-03-MA416" for PA-66 (hereinafter referred to as glass fiber (4))

All glass fibers (1) to (4) are products of Asahi Fiber Glass Co., Ltd. having a strand length of 3 mm.

(C) Epoxy group- or acid anhydride group-containing ethylene copolymer:

1) E/GMA/MA=65/7/28 (by weight); melt index (MI; 190° C., 2160 g, hereinafter the same)=10 g/10 min (hereinafter referred to as copolymer (1))

2) E/MAH/EA=67/3/30 (by weight); MI=7 g/10 min (hereinafter referred to as copolymer (2))

(wherein E: ethylene; GMA: glycidyl methacrylate; MA: methyl acrylate)

Physical properties of the resin compositions or molded articles obtained in Examples and Comparative Examples were measured according to the following methods.

1) Melt Flow Rate

Measured at 230° C. for PBT and PA-6 and 280° C. for PET and PA-66, respectively under a load of 2,160 g according to JIS K6760.

2) Flexural Modulus:

Measured on a 3.2 mm-thick specimen according to JIS K7203.

3) Tensile Properties:

3-1) Ultimate Strength

Measured on a 3.2 mm-thick specimen according to JIS K7113.

3-2) Ultimate Elongation

Measured on a 3.2 mm-thick specimen according to JIS K7113.

4) Izod Impact Strength (V-notched):

Measured on a 3.2 mm-thick V-notched specimen at 23° C. or −30° C. in accordance with JIS K7110.

5) Falling Weight Impact Strength (FWI):

Measured on a 3 mm-thick specimen at −30° C. under a load of 5 kg in accordance with JIS K7211.

6) Heat Distortion Temperature (HDT):

Measured on a 6.4 mm-thick specimen under a flexure stress of 4.6 kg/cm$^2$ in accordance with JIS K7207.

7) Surface Smoothness:

Surface smoothness of a molded article was observed with the naked eye.

EXAMPLE 1

A vented twin-screw extruder having a side feed opening at the middle of the barrel ("TEX 30" manufactured by Japan Seel Works, Ltd.; diameter: 30 mm; L/D=40) was used with the cylinder temperature being set at 260° C. From the main feed opening of the extruder was fed 74 parts of PBT. While melting PBT, 32 parts of glass fiber (1) was fed to the extruder through the side feed opening and melt-kneaded. The resulting composition was dried at 120° C. for 3 hours and then dry blended with 26 parts of pellets of copolymer (1). The resulting resin composition was injection molded in a 5 oz. injection molding machine ("IS-100-EN" manufactured by Toshiba Corporation) at a cylinder temperature of 260° C. and a mold temperature of 70° C. to prepare specimens for physical properties measurements. The results of the measurements are shown in Table 1 below.

COMPARATIVE EXAMPLE 1

A resin composition was prepared from the same amounts of the same materials as used in Example 1, except that PBT and copolymer (1) were fed from the main feed opening and that glass fiber (1) was fed from the side feed opening. The results of the measurements of physical properties are shown in Table 1.

COMPARATIVE EXAMPLE 2

A resin composition was prepared from the same materials as used in Example 1, except that 74 parts of PBT, 26 parts of glass fiber (1), and 26 parts of copolymer (1) were all fed from the main feed opening. The results of the measurements are shown in Table 1.

COMPARATIVE EXAMPLE 3

A resin composition was prepared in the same manner as in Example 1, except that 74 parts of PBT was fed from the main feed opening, 32 parts of glass fiber (1) was fed from the side feed opening, and no copolymer was used as component (C). The results of the measurements are shown in Table 1.

EXAMPLE 2

A resin composition was prepared in the same manner as in Example 1, except for setting the cylinder temperature at 280° C., feeding 79 parts of PET from the main feed opening, feeding 43 parts of glass fiber (2) from the side feed opening, and dry blending the resulting pellets with 21 parts of copolymer (1). The results of the measurements are shown in Table 1.

COMPARATIVE EXAMPLE 4

A resin composition was prepared in the same manner as in Example 2, except for feeding 79 parts of PET and 21 parts of copolymer (1) from the main feed opening and feeding 43 parts of glass fiber (2) from the side feed opening. The results of the measurements are shown in Table 1.

EXAMPLE 3

A resin composition was prepared in the same manner as in Example 2, except for setting the cylinder temperature at 260° C. and using PA-6 and glass fiber (3) as components (A) and (B), respectively. The results of the measurements are shown in Table 2.

COMPARATIVE EXAMPLE 5

A resin composition was prepared in the same manner in Comparative Example 4, except for setting the cylinder temperature at 260° C. and using PA-6 and glass fiber (3) components (A) and (B), respectively. The results of the measurements are shown in Table 2.

EXAMPLE 4

A resin composition was prepared in the same manner in Example 2, except for setting the cylinder temperature 260° C. and using PA-6, glass fiber (3), and copolymer (2) components (A), (B), and (C), respectively. The results of the measurements are shown in Table 2.

COMPARATIVE EXAMPLE 6

A resin composition was prepared in the same manner in Comparative Example 4, except for setting the cylinder temperature at 260° C. and using PA-6, glass fiber (3), and copolymer (2) as components (A), (B), and (C), respectively. The results of the measurements are shown in Table 2.

EXAMPLE 5

A resin composition was prepared in the same manner as in Example 2, except for using PA-66 and glass fiber (4) as components (A) and (B), respectively. The results of the measurements are shown in Table 3.

COMPARATIVE EXAMPLE 7

A resin composition was prepared in the same manner as in Comparative Example 4, except for using PA-66 and glass fiber (4) as components (A) and (B), respectively. The results of the measurements are shown in Table 3.

EXAMPLE 6

A resin composition was prepared in the same manner as in Example 2, except for using PA-66, glass fiber (4), and copolymer (2) as components (A), (B), and (C), respectively. The results of the measurements are shown in Table 3.

COMPARATIVE EXAMPLE 8

A resin composition was prepared in the same manner as in Comparative Example 4, except for using PA-66, glass fiber (4), and copolymer (2) as components (A), (B), and (C), respectively. The results of the measurements are shown in Table 3.

TABLE 1

|  | Example 1 | Comp. Example 1 | Comp. Example 2 | Comp. Example 3 | Example 2 | Comp. Example 4 |
|---|---|---|---|---|---|---|
| Composition (part): |  |  |  |  |  |  |
| Main Feed Opening | PBT (74) | PBT (74) copolymer (1) (26) | PBT (74) glass fiber (1) (32) copolymer (1) (26) | PBT (74) | PET (79) | PET (79) copolymer (1) (21) |
| Side Feed Opening | glass fiber (1) (32) | glass fiber (1) (32) |  | glass fiber (1) (32) | glass fiber (2) (43) | glass fiber (2) (43) |
| Injection Molding Machine Hopper | copolymer (1) (26) |  |  |  | copolymer (1) (21) |  |
| MFR (g/10 min) | 1.7 | 0.5 | 0.1 | 15 | 40 | 30 |
| Flexural Modulus (kg/cm$^2$) | 51900 | 46300 | 28000 | 49200 | 68500 | 67000 |
| Tensile Properties: |  |  |  |  |  |  |
| Ultimate Strength (kg/cm$^2$) | 685 | 750 | 700 | 431 | 861 | 827 |
| Ultimate Elongation (%) | 6.3 | 7.8 | 9.5 | 7.0 | 3.6 | 2.2 |
| Impact Strength (V-notched) (kg·cm/cm): |  |  |  |  |  |  |
| at 23° C. | 27 | 19 | 21 | 5 | 18 | 9 |
| at −30° C. | 14 | 8 | 9 | 5 | 11 | 7 |
| FWI (−30° C.) (kg·cm) | 28 | 15 | 28 | 13 | 15 | 4 |
| HDT (°C.) | 217 | 214 | 204 | 216 | 220 | 100 |
| Surface Smoothness | good | good | good | good | good | poor |

TABLE 2

|  | Example 3 | Comp. Example 5 | Example 4 | Comp. Example 6 |
|---|---|---|---|---|
| Composition (part): |  |  |  |  |

TABLE 2-continued

|  | Example 3 | Comp. Example 5 | Example 4 | Comp. Example 6 |
|---|---|---|---|---|
| Main Feed Opening | PA-6 (79) | PA-6 (79) copolymer (1) (21) | PA-6 (79) | PA-6 (79) copolymer (2) (21) |
| Side Feed Opening | glass fiber (3) (43) | glass fiber (3) (43) | glass fiber (3) (43) | glass fiber (3) (43) |
| Injection Molding Machine Hopper | copolymer (1) (21) |  | copolymer (2) (21) |  |
| MFR (g/10 min) | 14 | 7 | 12 | 5 |
| Flexural Modulus (kg/cm$^2$) | 58200 | 56900 | 56400 | 53500 |
| Tensile Properties: |  |  |  |  |
| Ultimate Strength (kg/cm$^2$) | 1130 | 1020 | 1120 | 1030 |
| Ultimate Elongation (%) | 3.1 | 1.5 | 3.1 | 1.9 |
| Impact Strength (V-notched) (kg · cm/cm): |  |  |  |  |
| at 23° C. | 24 | 10 | 26 | 12 |
| at −30° C. | 13 | 8 | 13 | 9 |
| FWI (−30° C.) (kg · cm) | 24 | 13 | 28 | 17 |
| HDT (°C.) | 223 | 218 | 220 | 216 |
| Surface Smoothness | good | good | good | good |

TABLE 3

|  | Example 5 | Comp. Example 7 | Example 6 | Comp. Example 8 |
|---|---|---|---|---|
| Composition (part): |  |  |  |  |
| Main Feed Opening | PA-66 (79) | PA-66 (79) copolymer (1) (21) | PA-66 (79) | PA-66 (79) copolymer (2) (21) |
| Side Feed Opening | glass fiber (4) (43) | glass fiber (4) (43) | glass fiber (4) (43) | glass fiber (4) (43) |
| Injection Molding Machine Hopper | copolymer (1) (21) |  | copolymer (2) (21) |  |
| MFR (g/10 min) | 22 | 4.4 | 7.0 | 3.5 |
| Flexural Modulus (kg/cm$^2$) | 63300 | 61900 | 63000 | 62600 |
| Tensile Properties: |  |  |  |  |
| Ultimate Strength (kg/cm$^2$) | 1250 | 1100 | 1030 | 959 |
| Ultimate Elongation (%) | 3.3 | 2.6 | 2.7 | 2.1 |
| Impact Strength (notched) (kg · cm/cm): |  |  |  |  |
| at 23° C. | 20 | 11 | 19 | 9 |
| at −30° C. | 11 | 8 | 10 | 7 |
| FWI (−30° C.) (kg · cm) | 25 | 13 | 23 | 10 |
| HDT (°C.) | 262 | 258 | 261 | 258 |
| Surface Smoothness | good | poor | good | poor |

As is apparent from the results in Tables 1 to 3, the reinforced crystalline engineering plastic compositions produced by the process of the present invention exhibit excellent fluidity for molding and provide a molded article having a satisfactory appearance with well-balanced mechanical and thermal properties, such as impact strength.

Seeing that no literature gives a suggestion on the special method of compounding with reference to engineering plastic compositions, the process of the present invention for producing a reinforced crystalline engineering plastic composition is deemed far beyond anticipation from the conventional techniques.

Further, the composition obtained by the process of the present invention can be molded with ease into various molded articles, films, sheetings, etc. by general molding methods, for example, injection molding or extrusion molding, to provide a molded or extruded article excellent in appearance in terms of uniformity and smoothness while exhibiting well-balanced physical properties, such as impact resistance, rigidity, and heat resistance.

While the invention has been described in detail and with reference to specific examples thereof, it will be apparent to one skilled in the art that various changes and modifications can be made therein without departing from the spirit and scope thereof.

What is claimed is:

1. A process for producing a reinforced crystalline engineering plastic composition, which comprises melt-kneading (A) 60 to 97 parts by weight of at least one crystalline engineering plastic selected from the group consisting of a saturated polyester resin, a polyphenylene sulfide resin, and a polyamide resin, and (B) 5 to 100 parts by weight, per 100 parts by weight of the sum of (A) and (C), of glass fibers, and melt-kneading the resulting mixture with (C) 3 to 40 parts by weight of an ethylene copolymer which is either (i) an epoxy group-containing ethylene copolymer comprising (a) from 50 to 99% by weight of an ethylene unit, (b) from 0.1 to 50% by weight of an unsaturated carboxylic acid glycidyl ester unit, and (c) up to 50% by weight of an ethylenically unsaturated ester compound unit, based on the weight of said ethylene copolymer, or (ii) an acid anhydride group-containing ethylene copolymer comprising (a) from 40 to 90% by weight of an ethylene unit, (b) from 0.3 to 10% by weight of a maleic anhydride unit, and (c) from 5 to 60% by weight of an $\alpha,\beta$-unsaturated carboxylic acid alkyl ester unit, based on the weight of said ethylene copolymer.

2. A process as claimed in claim 1, wherein the melt-kneading of said ethylene copolymer is carried out in an injection molding machine.

3. A process as claimed in claim 1, wherein said saturated polyester resin is polybutylene terephthalate.

4. A process as claimed in claim 1, wherein said saturated polyester resin is polyethylene terephthalate.

5. A process as claimed in claim 1, wherein said polyamide resin is polyamide 6.

6. A process as claimed in claim 1, wherein said polyamide resin is polyamide 66.

* * * * *